(12) United States Patent
Kopietz (10) Patent No.: US 10,313,679 B2
(45) Date of Patent: Jun. 4, 2019

(54) SYSTEMS AND METHODS FOR ENCODER-GUIDED ADAPTIVE-QUALITY RENDERING

(71) Applicant: ZeniMax Media Inc., Rockville, MD (US)

(72) Inventor: Michael Kopietz, Frankfurt (DE)

(73) Assignee: ZeniMax Media Inc., Rockville, MD (US)

(*) Notice: Subject to any disclaimer, the term of this patent is extended or adjusted under 35 U.S.C. 154(b) by 0 days.

(21) Appl. No.: 15/959,069

(22) Filed: Apr. 20, 2018

(65) Prior Publication Data

US 2018/0310008 A1 Oct. 25, 2018

Related U.S. Application Data

(60) Provisional application No. 62/653,056, filed on Apr. 5, 2018, provisional application No. 62/488,526, filed on Apr. 21, 2017.

(51) Int. Cl.
*H04N 19/172* (2014.01)
*G06T 15/00* (2011.01)
(Continued)

(52) U.S. Cl.
CPC .......... *H04N 19/172* (2014.11); *A63F 13/30* (2014.09); *A63F 13/355* (2014.09); *A63F 13/52* (2014.09);
(Continued)

(58) Field of Classification Search
USPC ............ 1/1; 345/419, 424; 348/43; 370/238; 375/240.01, 240.03; 382/170
See application file for complete search history.

(56) References Cited

U.S. PATENT DOCUMENTS 6,903,662 B2 6/2005 Rix et al.
7,844,002 B2 11/2010 Lu et al.
(Continued)

FOREIGN PATENT DOCUMENTS

CN 103605452 B 4/2018
CN 108027830 A 5/2018
(Continued)

OTHER PUBLICATIONS

Wang, Z. et al., "Image Quality Assessment: From Error Visibility to Structural Similarity," IEEE Transactions on Image Processing, 13(4), pp. 600-612, Apr. 2004.
(Continued)

*Primary Examiner* — Xuemei G Chen
(74) *Attorney, Agent, or Firm* — Blank Rome LLP (57) ABSTRACT

Systems and methods for improving computer technology related to the rendering and encoding of images are disclosed, preferably for use in a video-game environment. In certain embodiments, a codec is used to encode one or more reference images for a partial range of encoder settings and a renderer is used to generate one or more rendering quality-settings profiles, generate one or more reference images, calculate perceived qualities for each of the one or more reference images, re-render the one or more reference images for each of the one or more rendering quality-setting profiles, and calculate perceived qualities for each of the one or more re-rendered reference images. The renderer compares the perceived qualities of the reference images to the perceived qualities of the re-rendered images and matches them. Those matches result in an association of one or more encoder settings with their matching rendering quality-settings profiles into a look-up table. The lookup table is used to generate a rendered image at a substantially identical perceived quality to an encoded frame during gameplay.

20 Claims, 5 Drawing Sheets

(51) Int. Cl.
*A63F 13/30* (2014.01)
*H04N 19/124* (2014.01)
*A63F 13/52* (2014.01)
*A63F 13/355* (2014.01)
*H04N 19/154* (2014.01)

(52) U.S. Cl.
CPC ......... *G06T 15/005* (2013.01); *H04N 19/124* (2014.11); *H04N 19/154* (2014.11); *A63F 2300/538* (2013.01); *A63F 2300/66* (2013.01)

(56) References Cited

U.S. PATENT DOCUMENTS

| | | | |
|---|---|---|---|
| 8,069,258 | B1 | 11/2011 | Howell |
| 8,145,451 | B2* | 3/2012 | Hsu .................... A61B 5/04017 |
| | | | 341/155 |
| 8,154,553 | B2 | 4/2012 | Peterfreund |
| 8,654,835 | B2* | 2/2014 | Li ........................ H04N 19/105 |
| | | | 375/240.01 |
| 8,678,929 | B1 | 3/2014 | Nishimura et al. |
| 8,711,144 | B2* | 4/2014 | Johnson ................ G06T 7/0002 |
| | | | 345/419 |
| 8,873,636 | B2 | 10/2014 | Iwasaki |
| 9,358,466 | B2 | 6/2016 | Kruglick |
| 9,609,330 | B2 | 3/2017 | Puri et al. |
| 9,661,351 | B2 | 5/2017 | Laan |
| 9,665,334 | B2 | 5/2017 | Iwasaki |
| 9,697,280 | B2 | 7/2017 | Maharajh et al. |
| 9,705,526 | B1 | 7/2017 | Veernapu |
| 9,736,454 | B2 | 8/2017 | Hannuksela et al. |
| 9,749,642 | B2 | 8/2017 | Sullivan et al. |
| 9,762,911 | B2 | 9/2017 | Puri et al. |
| 9,762,919 | B2 | 9/2017 | Cote et al. |
| 9,774,848 | B2 | 9/2017 | Jayant et al. |
| 9,807,416 | B2 | 10/2017 | Kuusela |
| 9,865,043 | B2 | 1/2018 | Robinson et al. |
| 9,924,200 | B2 | 3/2018 | Spears et al. |
| 9,940,904 | B2 | 4/2018 | Romano et al. |
| 9,967,568 | B2 | 5/2018 | Rossato et al. |
| 9,984,445 | B2 | 5/2018 | Valdes Lopez et al. |
| 10,040,323 | B2 | 8/2018 | Stuckey et al. |
| 10,062,181 | B1 | 8/2018 | Longhurst et al. |
| 10,097,946 | B2 | 10/2018 | Stanwood et al. |
| 10,098,960 | B2 | 10/2018 | Greenebaum et al. |
| 2006/0230428 | A1 | 10/2006 | Craig et al. |
| 2007/0147497 | A1* | 6/2007 | Bao ...................... H04N 19/124 |
| | | | 375/240.03 |
| 2008/0012856 | A1* | 1/2008 | Yu ........................ G06T 7/0012 |
| | | | 345/424 |
| 2011/0261885 | A1 | 10/2011 | de Rivaz |
| 2013/0083163 | A1* | 4/2013 | Kwon ................. H04N 19/597 |
| | | | 348/43 |
| 2014/0226490 | A1* | 8/2014 | Khera .................... H04L 45/12 |
| | | | 370/238 |
| 2015/0169960 | A1* | 6/2015 | Laksono .............. G06K 9/4652 |
| | | | 382/170 |
| 2015/0228106 | A1 | 8/2015 | Laksono |
| 2016/0198166 | A1 | 7/2016 | Kudana et al. |
| 2016/0227172 | A1* | 8/2016 | Safaei ..................... G06T 15/20 |
| 2017/0132830 | A1 | 5/2017 | Ha et al. |
| 2017/0155910 | A1 | 6/2017 | Owen |
| 2017/0200253 | A1 | 7/2017 | Ling |
| 2017/0264902 | A1* | 9/2017 | Ye ........................ H04N 19/124 |
| 2017/0278296 | A1 | 9/2017 | Chui et al. |
| 2018/0124078 | A1* | 5/2018 | Hajmasan ........... H04L 63/1425 |
| 2018/0144725 | A1 | 5/2018 | Keramidas et al. |
| 2018/0150296 | A1 | 5/2018 | Son et al. |
| 2018/0182359 | A1 | 6/2018 | Liu et al. |
| 2018/0184129 | A1 | 6/2018 | Spears et al. |
| 2018/0197035 | A1 | 7/2018 | Venkataraman et al. |
| 2018/0197304 | A1 | 7/2018 | Golas et al. |
| 2018/0197323 | A1 | 7/2018 | Howson et al. |
| 2018/0220141 | A1 | 8/2018 | Rossato et al. |
| 2018/0270506 | A1 | 9/2018 | Ruiz Coll |
| 2018/0286353 | A1 | 10/2018 | Romano et al. |

FOREIGN PATENT DOCUMENTS

| | | |
|---|---|---|
| CN | 104641643 B | 6/2018 |
| CN | 108334412 A | 7/2018 |
| EP | 1820281 B2 | 8/2017 |
| EP | 2989800 B1 | 10/2018 |
| GB | 2554877 A | 4/2018 |
| JP | H6121518 A | 4/1994 |
| JP | H6129865 A | 5/1994 |
| JP | 2018110403 A | 7/2018 |
| WO | WO-2009138878 A2 | 11/2009 |
| WO | WO-2016172314 A1 | 10/2016 |
| WO | WO-2018141228 A1 | 8/2018 |

OTHER PUBLICATIONS

Moorthy, A.K., "Efficient Motion Weighted Spatio-Termporal Video SSIM Index," Human Vision and Electronic Imaging XV, vol. 7527, Mar. 2010,(http://1ive.ece.utexas.edu/publications/2010/moorthy_spie_jan10.pdf).

BGR Microsoft Article http://bgr.com/2018/03/16/microsoft-netflix-for-games-subscription-cloud/.

Verge's Article on Blade Technology, https://www.theverge.com/2018/2/21/17029934/blade-shadow-us-launch-netflix-for-pc-comes-cloud-streaming-windows-10.

Parsec TechCrunch Article, <https://techcrunch.com/2017/12/19/is-the-time-finally-right-for-platform-agnostic-cloud-gaming/>.

* cited by examiner

REFERENCE IMAGE 404

| UI 402 | | |
|---|---|---|
| | 3D VIEW 400 | |
| | | UI 402 |
| UI 402 | | |

ENCODED REFERENCE IMAGES 406

- QP = 0
- ...
- QP = 4
- ...
- QP = 8
- ...
- QP = 16
- ...
- QP = 24
- ...
- QP = 51

SSIM 408

- 1
- 1
- 0.999
- 0.997
- 0.985
- 0.670

RE-RENDERED REFERENCE SCENE 410

- HIGHEST RESOLUTION
- ...
- 95% RESOLUTION
- ...
- 90% RESOLUTION
- ...
- 80% RESOLUTION
- ...
- 70% RESOLUTION
- ...
- LOWEST RESOLUTION

SSIM 412

- 1
- 1
- 0.999
- 0.997
- 0.985
- 0.670

LOOKUP TABLE 414

| QP = 0 | HIGHEST RESOLUTION |
|---|---|
| ... | |
| QP = 4 | 95% RESOLUTION |
| ... | |
| QP = 8 | 90% RESOLUTION |
| ... | |
| QP = 16 | 80% RESOLUTION |
| ... | |
| QP = 24 | 70% RESOLUTION |
| ... | |
| QP = 51 | LOWEST RESOLUTION |

FIG. 5

SYSTEMS AND METHODS FOR ENCODER-GUIDED ADAPTIVE-QUALITY RENDERING

RELATED APPLICATIONS

This application claims the benefit of the following U.S. Provisional Applications: No. 62/488,526, filed Apr. 21, 2017, and No. 62/653,056, filed Apr. 5, 2018.

BACKGROUND OF THE INVENTION

Remote gaming applications, in which a server-side game is controlled by a client-side player, have attempted to encode the video output from a three-dimensional (3D) graphics engine in real-time using existing or customized codecs, also referred to as encoders. However, the interactive nature of video games, particularly the player feedback loop between video output and player input, makes game video streaming much more sensitive to latency than traditional video streaming. Existing video coding methods can trade computational power, and little else, for reductions in encoding time. New methods for integrating the encoding process into the video rendering process can provide significant reductions in encoding time while also reducing computational power, improving the quality of the encoded video, and retaining the original bitstream data format to preserve interoperability of existing hardware devices.

When a video game instance is running on hardware local to the player, it is desirable to have the game output each pixel at the highest quality. However, in a server-side game instance where rendered output is encoded and transmitted to a remote client, the encoder may reduce image quality to fit within a limited bandwidth. If rendered quality is dramatically higher than the quality of the decoded output, there is a measurable amount of server-side rendering work that is lost.

By adapting the server-side rendered quality to match the post-quantization quality based on feedback from the encoder, the game can reduce wasted server-side computation without any noticeable client-side quality loss. The reduction in server-side computational waste may also result in additional benefits including reduced energy usage, reduced rendering times, and reduced player-feedback latency. The server-side computational savings is compounded in environments where multiple game instances are running on the same server.

In streaming environments for games that involve multiple players, particularly games such as Massive Multiplayer Online Games ("MMOGs"), ensuring that server-side rendering work is not wasted becomes increasingly important. Due to the limited bandwidth available to players of MMOGs, an encoder that maximizes rendering quality while preventing a slowdown in the game is particularly important. Current technologies, as discussed below, adopt various methods to attempt to address this problem, but remain deficient.

U.S. Patent Publication No. US20170132830A1 ("the '830 Publication"), discloses systems and methods for determining a select shading point in a 3D scene on which shading is to be performed, performing the shading on the determined shading point, and determining shading information of the 3D scene based on a result of the shading performed on the determined shading point. The shading of the scene is adjusted based on temporal characteristics of the scene. However, this technology does not address the fundamental problem of optimizing encoding based on server-side rendering capabilities and available bandwidth.

U.S. Patent Publication No. US20170200253A1 ("the '253 Publication") discloses systems and methods for improving rendering performance of graphics processors. At the graphics processor, an upper threshold can be set so that when a frame greater than the set threshold is encountered, the graphics processor takes appropriate action to reduce rendering time. However, this technology is based solely on a set threshold and does not dynamically adjust to server-side rendering capabilities and available bandwidth.

U.S. Patent Publication No. US2017/0278296A1 ("the '296 Publication") discloses systems and methods in which the initial rendering of a scene that determines texture at each portion of the scene is generated, and a ray traced rendering of the scene is generated by tracing an initial sample of rays. This reference discloses that an optimal number of samples for each pixel is intelligently determined based on foreknowledge of scene textures and identifying noise arising due to under-sampling during ray tracing. Once more, this technology is limited to optimal ray sampling and does not dynamically adjust to server-side rendering capabilities and available bandwidth.

As is apparent from the above discussion of the state of the art in this technology, there is a need in the art for an improvement to the present computer technology related to the rendering and encoding of games.

SUMMARY OF THE INVENTION

It is therefore an object of the present invention to disclose systems and methods for optimizing rendering by using a codec (which may also be referred to herein as an encoder) to encode one or more reference images for a partial range of encoder settings and a renderer to generate one or more rendering quality-settings profiles, generate the one or more reference images, calculate perceived qualities for each of the one or more reference images, re-render the one or more reference images for each of the one or more rendering quality-setting profiles, and calculate perceived qualities for each of the one or more re-rendered reference images. The renderer compares the perceived qualities of reference images to the perceived qualities of re-rendered images and matches them. Those matches result in an association of one or more encoder settings with their matching rendering quality-settings profiles into a look-up table. The lookup table is used to generate a rendered image at a substantially identical perceived quality to an encoded frame during gameplay.

It is another object of the present invention to disclose systems and methods for optimizing encoding and rendering by using a renderer to calculate computational costs for each of the re-rendered reference images.

It is yet another object of the present invention to disclose systems and methods for optimizing encoding and rendering by applying a structural similarity index to calculate perceived qualities of images.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

Modern rendering engines, such as those used in video games, have the ability to adapt certain quality settings during runtime based on factors such as a player's distance from an object, the rendering time of the previous frame, or other runtime measurements. A rendering engine may provide several methods to adjust quality, allowing for more granular control of the overall rendered quality. Some examples include biasing texture sampling to use blurrier mipmaps, using lower quality cascades or fewer samples on shadows, running a simplified path on the shading model (e.g. DCT-transforms of specular to look like diffuse), and using fewer samples for post processing (e.g. for Gaussian, volumetric fog, etc.). In live-streaming applications, altering one or more rendering quality settings in response to changes in encoder settings may provide the best rendering-cost savings without impacting the encoded output quality.

Figure 1:
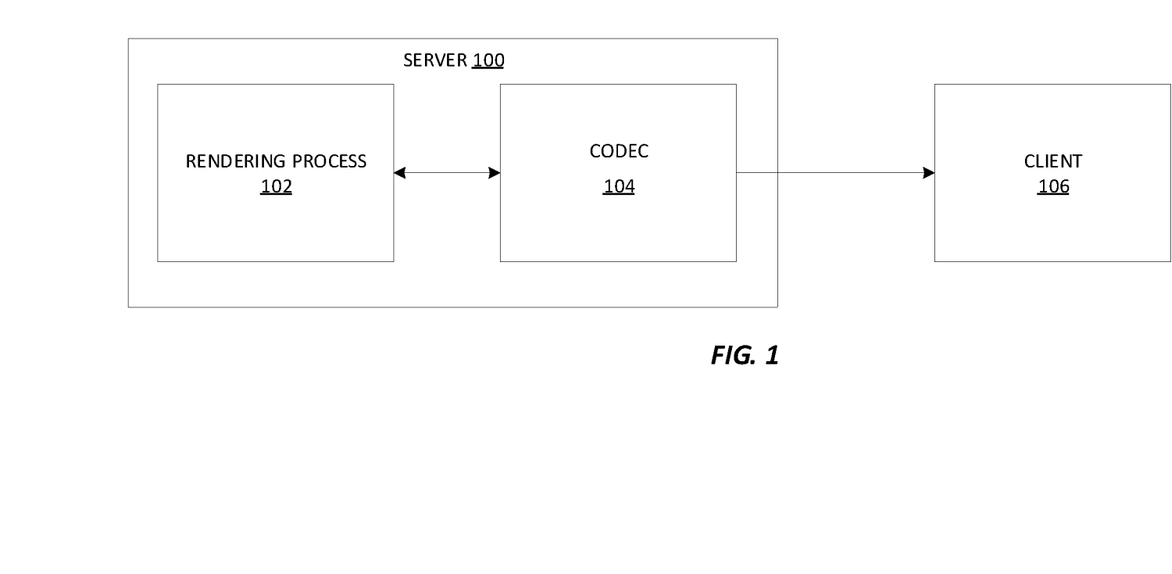
FIG. 1 is a diagram of an exemplary environment in which a livestreaming codec can communicate settings back to the renderer producing the video, in accordance with an embodiment of the invention.

FIG. 1 is a diagram of an exemplary environment in which real-time rendered video is livestreamed to a remote viewer. The server 100 may be any hardware capable of simultaneously running a real-time rendering process 102 (also referred to as a renderer below) and a streaming codec 104. The codec 104 must also have the ability to communicate its quantization settings back to the rendering process 102 through direct reporting or some other monitoring process known in the art. The encoded video stream is transmitted over a network to a client device 106. The client 106 may be any hardware capable of decoding and displaying the video stream.

Figure 2:
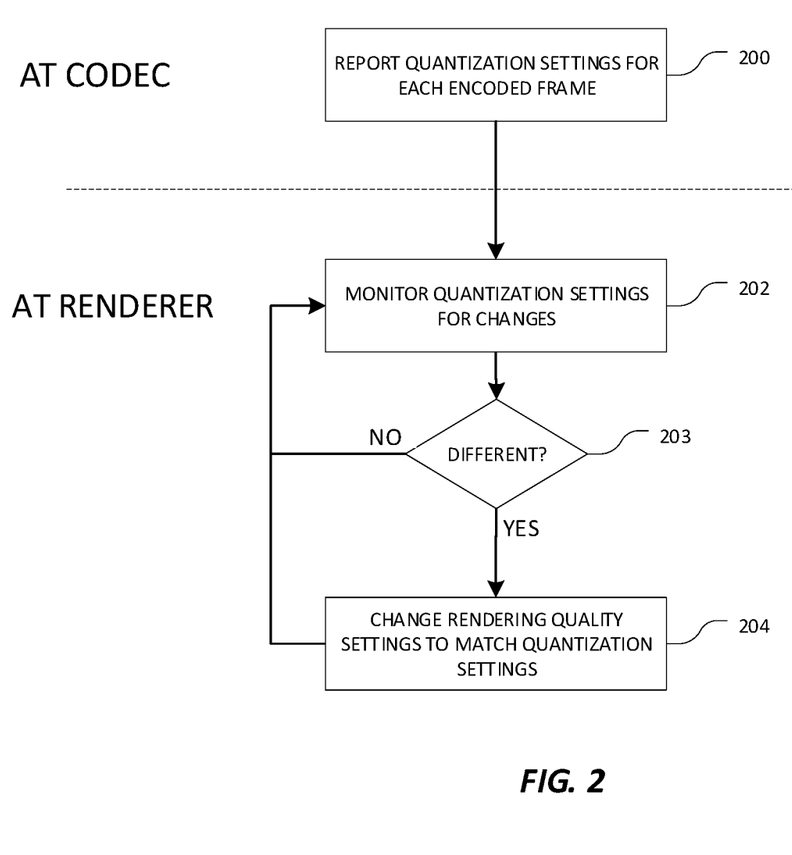
FIG. 2 is a flow diagram outlining the exemplary stages of encoder-guided adaptive-quality rendering, in accordance with an embodiment of the invention.

FIG. 2 is a flow diagram outlining the exemplary stages of encoder-guided adaptive-quality rendering. Livestream encoding using an H.264 standard-compliant encoder typically employs a Constant Rate Factor ("CRF") mode which reports the effective quantization settings for an encoded frame as a quantization parameter ("QP") at "REPORT QUANTIZATION SETTINGS FOR EACH ENCODED FRAME," step 200. In certain embodiments, the H.264 standard compliant library used is ffmpeg, which outputs the quantization parameter as the variable, f_crf_avg. The quantization parameter is an index, ranging from 0 to 51, which defines how lossy the compression is during encoding. Lower values of QP represent lower compression while higher values of QP represent higher compression. In order to remain at a constant bitrate, an encoder operating in CRF mode will increase the QP for frames which can afford higher compression and decrease the QP for frames that require higher quality. The encoder takes advantage of the fact that the human eye is less able to distinguish detail on moving objects by increasing compression in areas which have comparatively high motion and decreasing compression in areas which are relatively still. This allows the encoder to maintain a target perceived quality while reducing the size of some encoded frames.

The renderer reads the reported QP before rendering a frame at "MONITOR QUANTIZATION SETTINGS FOR CHANGES," step 202. At "DIFFERENT?," step 203, if the effective quantization settings have not changed since the previously rendered frame, the renderer takes no action to adapt rendering quality and will check again on the next frame. If the renderer reads a QP value which is different than the previously rendered frame, or if this is the first encoded frame for which encoder-guided adaptive-quality rendering is being performed, the rendering quality is altered at "CHANGE RENDERING QUALITY SETTINGS TO MATCH QUANTIZATION SETTINGS," step 204. If the QP value has increased since the previously rendered frame, the renderer will lower the quality to match the compression level at the encoder. Likewise, if the QP value has decreased since the previously rendered frame, the encoder will increase the quality. To change the rendering settings, the renderer will check a pre-generated lookup table that provides a rendering quality-settings profile for the encoder-provided QP value. In general, there should be only one entry per encoder quality setting. The renderer uses the encoder-provided QP, finds the one entry, and uses the associated rendering quality-settings profile. In general, the entire rendering quality-settings profile is applied. A rendering quality-settings profile is defined as a list of values for each available rendering quality setting. The pre-generation of this lookup table is described in more detail in reference to FIG. 3. The pre-defined lookup table may define rendering settings for integer-values of QP, which requires the renderer to round the read QP value to the nearest integer, or the lookup table may define rendering settings for each partial range of QP values between 0 and 51. The examples in FIG. 4 and FIG. 5 assume the renderer will round the QP to the nearest integer before using the lookup table, but the examples may be modified to define a lookup table using partial ranges of QP instead. The renderer will alter the quality settings according to the rendering quality-settings profile fetched from the lookup table before rendering the next frame. Reducing rendering quality will reduce the amount of rendering work that is wasted when the encoder bottlenecks the quality.

Figure 3:
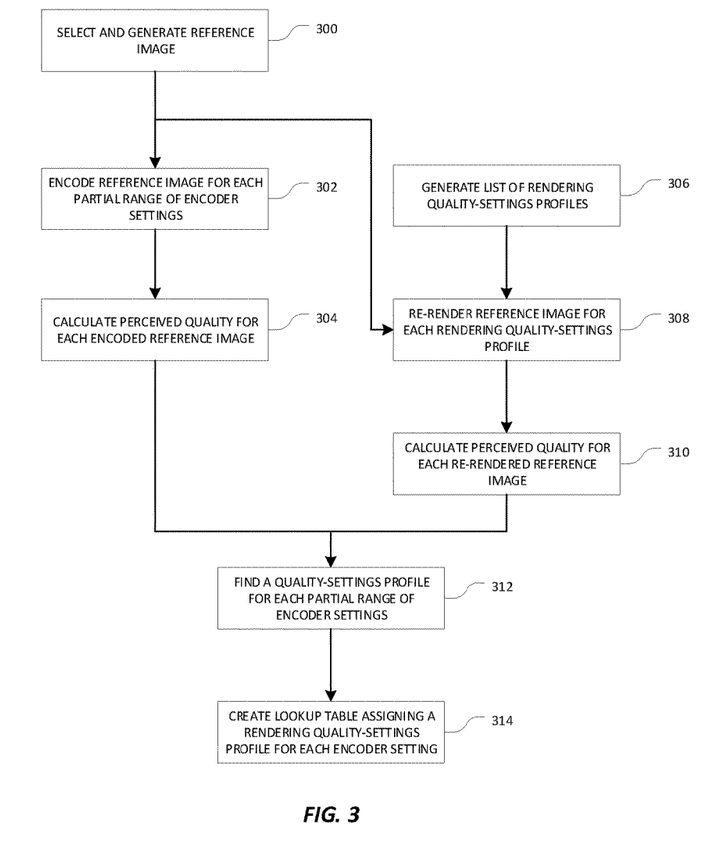
FIG. 3 is a flow diagram outlining the exemplary pre-generation of the lookup table that assigns a rendering quality-settings profile to each partial range of the encoder settings, in accordance with an embodiment of the invention.

FIG. 3 is a flow diagram outlining the exemplary pre-generation of the lookup table that assigns a rendering quality-settings profile to each partial range of the encoder settings. A reference image will be used as a baseline to measure the effects on perceived quality as the encoding settings or rendering settings are changed. The reference image should represent a typical frame of video output and include rendered elements such as models, textures, or visual effects that are typical to a chosen game context. The game context might include a specific area, specific map, specific level, or some specific gameplay. The selected reference image will be used to generate a lookup table that estimates the perceived quality of video rendered within the same context as the reference image. For example, the lookup table generated from a reference image that contains a representative set of elements from a game level may be used to estimate the perceived quality of video rendered from similar scenes within the same level. Methods for combining multiple lookup tables into a generalized lookup table are discussed further below. After a game context is identified, a representative scene should be chosen and rendered at full quality, as shown at "SELECT AND GENERATE REFERENCE IMAGE" step 300. The full-quality rendered scene of the representative scene is referred to herein as the reference image.

A preferred embodiment of the runtime behavior of the renderer, discussed above in connection with the description of FIG. 2, requires the renderer to round the received values of QP to the nearest integer before reading the lookup table. As a result, the lookup table will be generated using only integer-values of QP. At the encoder, the full-quality reference image is encoded for each integer-valued quality setting in the encoder, quantization parameter (QP) integer values 0 through 51, as shown at "ENCODE REFERENCE IMAGE FOR EACH PARTIAL RANGE OF ENCODER SETTINGS," step 302. In the preferred embodiment, there are 52 partial ranges which are defined by the rounding operation performed by the renderer. The implementation can be modified to create more partial ranges for the more-common QP values, values in the middle of the range from 0 to 51, or fewer partial ranges for the more-rare QP values, values at the extremes of the range from 0 to 51.

Perceived quality is an attempt to quantify how well the human eye can perceive quality loss between a compressed image and the full-quality source image. There are several methods used to estimate perceived quality, including mean squared error (MSE) and peak signal-to-noise ratio (PSNR), which use only the luminance and contrast value differences between two images to calculate the quality of a compression codec. As disclosed by Z. Wang, A. C. Bovik, H. R. Sheikh and E. P. Simoncelli, "Image quality assessment: From error visibility to structural similarity," *IEEE Transactions on Image Processing*, vol. 13, no. 4, pp. 600-612, April 2004, the structural similarity (SSIM) index is a method which adds the assumption that the human eye is also adept at extracting structural information from a scene and defines a calculation to estimate perceived quality. SSIM works by comparing pixel-data between two images: the uncompressed full-quality reference image to the encoded image. The algorithm compares the luminance, contrast, structure, and sometimes chrominance over "windows" of 8×8 pixels. Because SSIM has a low computation cost and outperforms methods like MSE and PSNR, it is the preferred tool for calculating perceived quality. To generate the perceived quality for each value of the encoder settings, preferably at the renderer and/or the game engine, the SSIM index is calculated between each encoded reference image and the reference image as shown at "CALCULATE PERCEIVED QUALITY FOR EACH ENCODED REFERENCE IMAGE," step 304. In the preferred embodiment, 52 SSIM values are calculated, one for each quantization parameter (QP) integer, with a value of 0 through 51. The exemplary descriptions in reference to FIG. 3, FIG. 4, and FIG. 5 use a standard SSIM calculation to compare two still images, but there are SSIM method variants which can compare two video segments and which may be used instead at an increased computational cost. One such SSIM variant is the Spatio-Temporal SSIM as disclosed by Anush K. Moorthy and Alan C. Bovik, "Efficient Motion Weighted Spatio-Temporal Video SSIM Index," *Human Vision and Electronic Imaging XV*, vol. 7527, March 2010 (available at http://live.ece.utexas.edu/publications/2010/moorthy_spie_jan10.pdf).

The renderer may have several settings available for per-pixel-quality control including screen resolution, mipmap selection, level-of-detail (LOD) selection, shadow quality, post-processing quality, or other settings. A quality-settings profile is defined as a list of values for each available quality setting. In certain embodiments, at the renderer, a list of all rendering settings which can be adaptively altered, along with their possible values, are gathered. Then all permutations of adaptive quality rendering settings and their values are generated to create a list of rendering quality-settings profiles, as shown at "GENERATE LIST OF RENDERING QUALITY-SETTINGS PROFILES," step 306. Since a renderer may have many quality settings with many possible values, the number of permutations of quality-settings profiles may be prohibitively long. The example of FIG. 5 discusses an exemplary method for limiting and optimizing the number of quality-settings profiles in the list.

For each rendering quality-settings profile in the list, the reference image should be re-rendered at the renderer using the specified rendering settings, as shown at "RE-RENDER REFERENCE IMAGE FOR EACH RENDERING QUALITY-SETTINGS PROFILE," step 308. If the rendering quality-settings profiles are comprised of more than one setting, the rendering times for each re-rendered reference image should also be recorded as a measure of computation cost, exemplarily measured in rendering time or clock-cycles. This measure of computational cost may be used in a later step as a tie-breaker if there are any SSIM value collisions.

Using the same measure of perceived quality as previously used in step 304, the perceived quality is measured by comparing each of the re-rendered images to the original reference image, as shown at "CALCULATE PERCEIVED QUALITY FOR EACH RE-RENDERED REFERENCE IMAGE," step 310. In the preferred embodiment, the structural similarity index (SSIM) is used to measure the perceived quality of the encoder results and will be used to measure the perceived quality of the re-rendering results.

Figure 5:
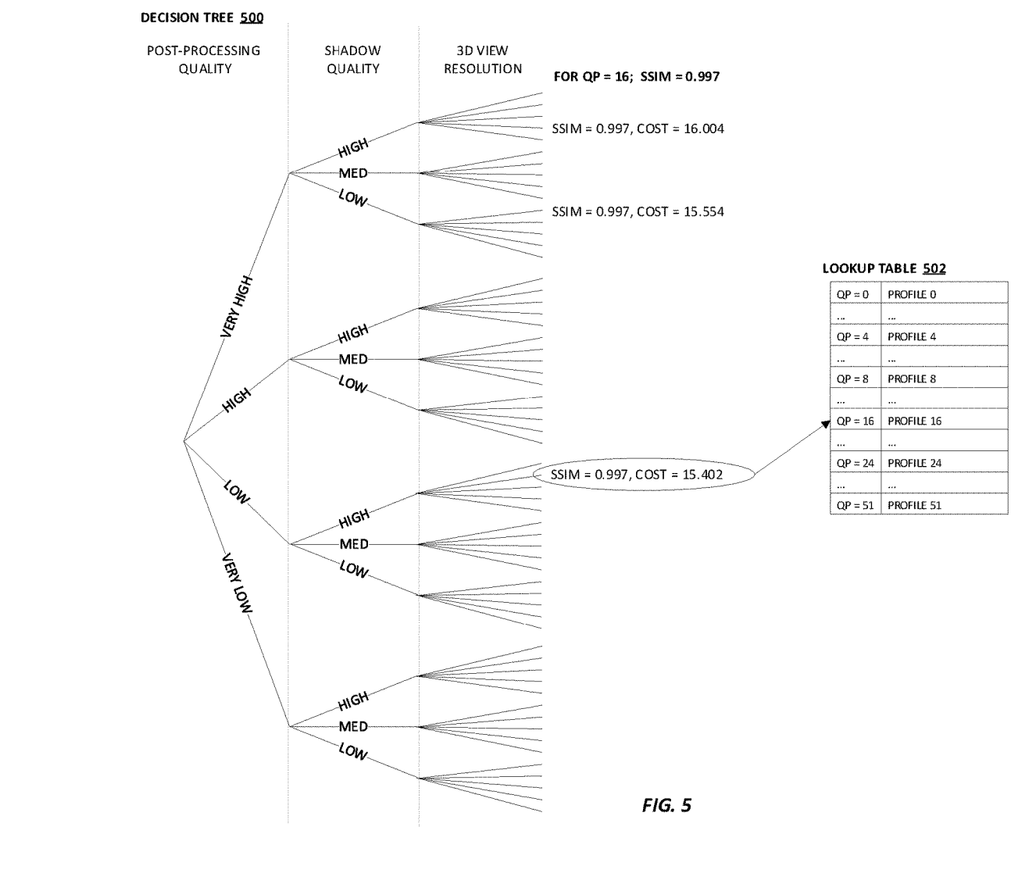
FIG. 5 is a diagram of an exemplary lookup table generation for rendering quality-settings profiles which contains multiple settings, in accordance with an embodiment of the invention.

At the renderer, the two sets of perceived quality values, the SSIM values for the encoded reference images calculated at step 304 and the SSIM values for the per-profile re-rendered reference images calculated at step 310, are compared across both image sets to find matching SSIM values between the two sets. Ideally, for each encoded reference image's SSIM value, there is one exact matching SSIM value from the set of per-profile re-rendered images. If there are no exact matches, the chosen per-profile re-rendered image's SSIM value should be both greater than and as close as possible to the target encoded reference image's SSIM value. The matching SSIM values across both sets of perceived quality values will identify a rendering quality-settings profile for each value of QP, as shown at "FIND A QUALITY-SETTINGS PROFILE FOR EACH PARTIAL RANGE OF ENCODER SETTINGS," step 312. In cases where there is a collision, where there are two or more exact matches from the set of SSIM values for the per-profile re-rendered images, the computational costs recorded in step 308 may be used as a tie-breaker and the less costly rendering quality-settings profile selected for the encoder setting. FIG. 5 shows an example collision.

The encoder settings and their matching rendering quality-settings profiles should be organized into a lookup table as shown at "CREATE LOOKUP TABLE ASSIGNING A RENDERING- QUALITY-SETTINGS PROFILE FOR EACH ENCODER SETTING," step 314. This lookup table may be used during runtime at the renderer to change the rendering quality settings to match the quantization settings as described by step 204 in FIG. 2. The lookup table provides a rendering quality-settings profile that generates an image of the same perceived quality as the encoded frame and provides the largest computational savings for the given reference frame. Example lookup tables are shown in FIG. 4 and FIG. 5.

The lookup table generated by the method described in connection with FIG. 3 may be used within similar game contexts, scenes, or environments as the reference image. The process outlined in connection with FIG. 3 may be repeated for several reference images, each representative of a particular environment, scene type, or other meaningful game context. For example, a reference image may be selected from each map in a game to generate multiple map-specific lookup tables. Lookup tables may also be combined to create a lookup table that can be more generally used in the game environment. For example, map-specific lookup tables may be combined to generate one lookup table that may be used for all maps in a game. To combine lookup tables, the rendering quality-settings profiles for each QP may be combined to find an average value for each setting contained in the profile. For example, three lookup tables are generated for three reference images. The rendering quality-settings profiles are comprised of three settings values: a post-processing quality setting, a shadow quality setting, and a resolution setting. To combine the rendering quality-settings profiles for a QP value of 4, the profiles are read from each lookup table and are represented as $P4_1=\{3, MED, 95\%\}$, $P4_2=\{4, LOW, 90\%\}$, and $P4_3=\{2, MED, 90\%\}$. The average values are found for each setting to generate $PAvg=\{3, MED, 92\%\}$. A profile-averaging process should round up so that the rendering process is never generating images at a lower perceived quality level than the current encoding quality setting. The profiles are averaged for each value of QP and organized into a new lookup table.

Figure 4:
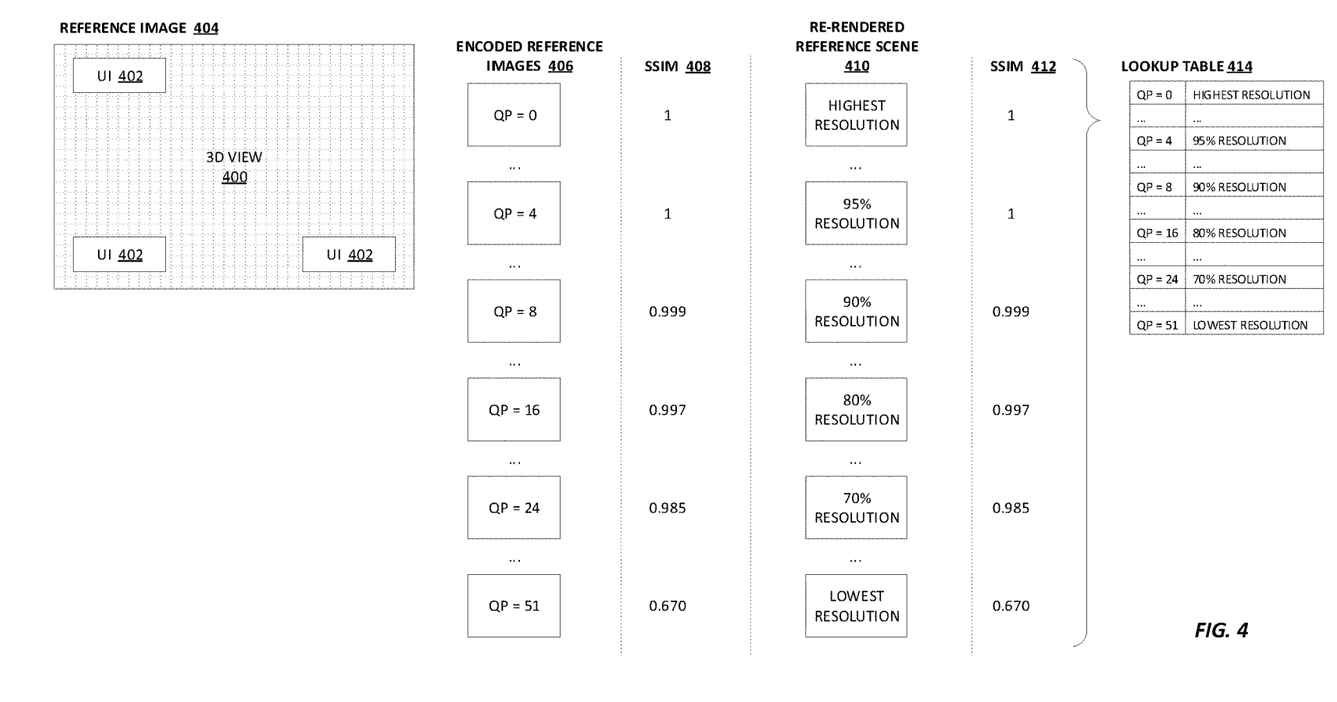
FIG. 4 is a diagram of an exemplary lookup table generation for rendering quality-setting profiles which are comprised of only one setting, in accordance with an embodiment of the invention.

FIG. 4 is an example of lookup table generation for rendering quality-setting profiles which are comprised of only one setting. In this example, a single rendering quality setting is adapted in response to changes in encoder quality settings. The rendering of a first-person view of a 3D scene is adapted at the renderer by altering the resolution of the 3D portions of the view, shown at "3D VIEW" 400, while the resolution of user interface (UI) elements, shown as "UI" 402, is not altered to maintain readability of any player-facing text. This type of selective resolution-scaling is referred to as dynamic resolution scaling and is an increasingly common feature of rendering engines. The reference image, shown at "REFERENCE IMAGE" 404, represents a single frame from a typical video output rendered in the highest possible resolution and is chosen in accordance with the guidelines outlined at step 300 of FIG. 3. At the encoder, the reference image, shown at "REFERENCE IMAGE" 404, is encoded for each integer-value of QP, as described in connection with step 302 of FIG. 3, to generate a list of encoded reference images at "ENCODED REFERENCE IMAGES" 406. As described in connection with step 304 of FIG. 3, at the renderer, the SSIM values, shown as "SSIM" 408, are calculated for each encoded reference image 406. Since the rendering quality-profile is comprised of only one quality setting, the number of quality-profile permutations is limited to the number of possible values available for the resolution of the 3D view, shown as "3D VIEW" 400. The number of possible resolution values is upper-bounded by the maximum possible resolution of the 3D view and lower-bounded by the minimum viable resolution for the 3D view. The aspect ratio may define how many resolution values exist between the minimum and maximum resolutions. For example, a maximum resolution of 3840×2160 has an aspect ratio of 16:9, and the minimum viable resolution in this aspect ratio is chosen as 1280×720. There are 160 possible resolutions with an aspect ratio of 16:9 between these upper and lower bounds. Alternatively, some number of same resolutions between the upper and lower bounds may be arbitrarily selected as resolution samples. For example, the resolution may be incrementally reduced in the x direction between 3840 and 1280 to select some number of sample resolution sizes.

At the renderer, the reference image is re-rendered, as shown at "RE-RENDERED REFERENCE SEQUENCE" 410, for each of the available resolution sizes or each of the selected sample resolution sizes, as described in connection with step 308 of FIG. 3. The SSIM values shown as "SSIM" 412 are calculated for each re-rendered image at the renderer, as described by step 310 of FIG. 3. The two sets of SSIM values, the SSIM values for the encoded reference images, as shown at "SSIM" 408, and the SSIM values for the per-profile re-rendered reference images, as shown at "RE-RENDERED REFERENCE SEQUENCE" 410, are compared to find matches across the image sets in order to provide a resolution setting for each integer-value of QP. The results are organized into a lookup table, as shown at "LOOKUP TABLE" 414, which will be used during runtime. By reducing the 3D view resolution to match the quantization settings, the wasted rendering work can be significantly reduced, which may result in additional benefits including reduced energy usage on the server, reduced rendering times, and improved player-feedback latency. These benefits are compounded in environments where multiple game instances are running on a single server.

FIG. 5 is an example of lookup table generation for a rendering quality-setting profiles which contains multiple settings. The process as described in connection with FIG. 3 is unchanged for selecting a reference image and measuring the perceived quality for each encoder setting as described in connection with steps 300, 302, and 304. Since the renderer may scale one or more rendering quality settings in relation to the value of QP, the list of generated rendering quality-settings profiles, described in connection with step 306 in FIG. 3, may be prohibitively long to facilitate re-rendering the reference image and calculating a perceived quality for each rendering quality-settings profile. Since there may be a very large number of rendering settings permutations, a decision tree may help to programmatically narrow down the possibility space. For example, it may be undesirable to have a rendering quality-settings profile in which the post-processing quality is very low, but every other setting is very high. In certain embodiments, it may be undesirable for high-quality shadows to be covered with low-quality post processes. In other embodiments, it may be the opposite. Decisions of this kind are subjective, but based on criteria including, but not limited to, computational cost associated with a particular rendering setting, perceptual quality differences between two values of a setting, the comparative obviousness of one rendering setting over another (such as close-up effects that consume large portions of the screen in comparison to far-away details that are only a few pixels wide), or relative gameplay importance (such as visual effects that are important for communicating feedback to the player).

FIG. 5 is an exemplary decision tree, as shown at "DECISION TREE" 500, which is comprised of a leaf for each permutation of four possible post-processing quality settings, three possible shadow quality settings, and five possible 3D view resolutions. This example decision tree is significantly smaller than a real-world example might be, as there might be many more adaptive rendering settings or many more options per setting, which will be apparent to one of ordinary skill in the art. The decision tree is preferably traversed according to any limiting conditions, such as avoiding leaves where post-processing quality is very low, but all other settings are high. For each leaf that is not removed by a limiting condition, the reference frame may be re-rendered with the rendering quality-settings profile associated with the leaf as described by 308 in FIG. 3. The computational cost, measured in rendering time or clock-cycles, may be recorded at this point to be used as a potential tie-breaker in case of perceived quality value collisions. Then, the perceived quality may be measured for each re-rendered image, as described in connection with step 310 of FIG. 3. For each calculated perceived quality value (SSIM) in the set calculated for the encoder settings, a list of all rendering quality-settings profiles with a matching SSIM value may be generated as described in connection with step 312 of FIG. 3. The example of FIG. 5 shows this list being generated for a QP value of 16.

The SSIM value for the reference image encoded with QP value 16 is 0.997, for which there are three rendering quality-settings profiles with matching SSIM values, shown with calculated computational costs 16.004, 15.554, and 15.402. Since there are three collisions for the perceived quality value, the computational costs recorded earlier serve as a tiebreaker and may be used to determine which rendering quality-settings profile is the cheapest, in this case, that which has a cost of 15.402. A lookup table, as shown at "LOOKUP TABLE" 502, should be generated to assign the cheapest rendering quality-settings profile to each value of QP as described by step 314 in FIG. 3. The rendering quality-settings profile selected for the QP value 16 is shown in FIG. 5 as "PROFILE 16."

Example 1: Effects on Rendering Time as a Proxy for Computational Waste

In an example implementation, only the resolution is scaled linearly in response to changes in encoder quality. For example, if the encoder quality drops by 50%, the resolution will be reduced by 50% in response. Since rendering time savings directly correlate to computational power savings, the rendering times were examined while the resolution was scaled. Measurements were taken in a low-motion environment, with a view comprising of a first-person view of the player's hands, weapon, and a stationary wall. This low-motion view was selected to limit the number of factors that may contaminate the measurements by impacting the measured rendering times. These factors may include post processes such as motion blur, changes in the number of rendered objects, changes in the on-screen textures, or other components of the view that are likely to change in high-motion views. A stationary view of a stationary scene also makes it possible to directly compare various measurements taken at scaled resolutions. The rendering engine was forced to output video at progressively lower resolutions and the results were measured as shown in Table 1 below.

TABLE 1

Effects of Resolution Scaling on Rendering Time

| Resolution Scale | Opaque Pass Time | Total Rendering Time |
|---|---|---|
| 100% | 0.4 ms | 1.4 ms |
| 50% | 0.3 ms | 1.0 ms |
| 25% | 0.2 ms | 0.8 ms |

The opaque pass is the portion of the rendering pipeline which draws the opaque geometry in the view. This is the portion of the rendering pipeline which is most sensitive to changes in resolution. Any rendering time savings or computational cost savings gained by scaling the resolution will come mostly from the opaque rendering pass.

As shown in Table 1, at a full resolution of 1280×720 at 60 frames, the rendering time for the opaque pass is 0.4 ms, out of a total rendering time of 1.4 ms. When the resolution is reduced to 50% of the full resolution, the rendering time for the opaque pass is 0.3 ms, out of a total rendering time of 1.0 ms. Scaling the resolution by 50% thus results in a significant rendering time savings of almost 30%. When the resolution is reduced to 25% of the full resolution, the rendering time for the opaque pass is 0.2 ms, out of a total rendering time of 0.8 ms. Scaling the resolution by 75% thus results in a significant rendering time savings of over 40%.

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A computer-implemented method for rendering, comprising the steps of:
generating one or more rendering quality-settings profiles;
generating one or more reference images;
encoding the one or more reference images for a partial range of encoder settings;
calculating a first perceived quality for each of the one or more reference images;
re-rendering the one or more reference images for each of the one or more rendering quality-setting profiles;
calculating one or more second perceived qualities for each of the one or more re-rendered reference images;
comparing the one or more first perceived qualities to the one or more second perceived qualities, wherein a match between one or more first perceived qualities and the one or more second perceived qualities results in an association of one or more encoder settings with their matching rendering quality-settings profiles in one or more look-up tables; and
generating a rendered image at a substantially identical perceived quality to an encoded frame on the basis of the look-up table.

2. The computer-implemented method of claim 1, further comprising the step of calculating a computational cost for each of the re-rendered reference images.

3. The computer-implemented method of claim 2, further comprising the step of, for the reference images and the re-rendered reference images, applying the computational cost of each of the re-rendered reference images to tiebreak multiple matches of the one or more first perceived qualities to the one or more second perceived qualities.

4. The computer-implemented method of claim 2, wherein the computational cost is measured in rendering time or clock-cycles.

5. The computer-implemented method of claim 1, wherein an algorithmic image quality assessment is computed and then used to calculate the first and second perceived qualities.

6. The computer-implemented method of claim 1, wherein the association of one or more encoder settings with their matching rendering quality-settings profiles is performed by applying a decision tree to programmatically narrow down possibility space.

7. The computer-implemented method of claim 1, wherein a structural similarity index (SSIM) is used to measure the first perceived qualities and the second perceived qualities.

8. The computer-implemented method of claim 1, wherein the one or more look-up tables are generated using a plurality of integer values or non-integer partial ranges of quantization parameters.

9. The computer-implemented method of claim 8, wherein the integer values of quantization parameters have a range of 0 to 51.

10. The computer-implemented method of claim 1, wherein the quality-settings profile is a list of values for each available rendering quality setting.

11. A system for rendering comprising:
a codec that encodes one or more reference images for a partial range of encoder settings; and
a renderer; wherein the renderer:
generates one or more rendering quality-settings profiles;
generates the one or more reference images;
calculates a first perceived quality for each of the one or more reference images;
re-renders the one or more reference images for each of the one or more rendering quality-setting profiles;
calculates one or more second perceived qualities for each of the one or more re-rendered reference images;
compares the one or more first perceived qualities to the one or more second perceived qualities, wherein a match between one or more first perceived qualities and the one or more second perceived qualities results in an association of one or more encoder settings with their matching rendering quality-settings profiles in one or more look-up tables; and
generates a rendered image at a substantially identical perceived quality to an encoded frame on the basis of the look-up table.

12. The system of claim 11, further comprising the step of calculating a computational cost for each of the re-rendered reference images.

13. The system of claim 12, further comprising step of, for the reference images and the re-rendered reference images, applying the computational cost of each of the re-rendered reference images to tiebreak multiple matches of the one or more first perceived qualities to the one or more second perceived qualities.

14. The system of claim 12, wherein the computational cost is measured in rendering time or clock-cycles.

15. The system of claim 11, wherein an algorithmic image quality assessment is computed and then a is used to calculate the first and second perceived qualities.

16. The system of claim 11, wherein the association of one or more encoder settings with their matching rendering quality-settings profiles is performed by applying a decision tree to programmatically narrow down possibility space.

17. The system of claim 11, wherein a structural similarity index (SSIM) is used to measure the first perceived qualities and the second perceived qualities.

18. The system of claim 11, wherein the one or more look-up tables are generated using a plurality of integer values or non-integer partial ranges of quantization parameters.

19. The system of claim 18, wherein the integer values of quantization parameters have a range of 0 to 51.

20. The system of claim 11, wherein the quality-settings profile is a list of values for each available rendering quality setting.

* * * * *